United States Patent [19]

Aittoniemi

[11] Patent Number: 5,121,105
[45] Date of Patent: Jun. 9, 1992

[54] METAL DETECTOR

[75] Inventor: Kari T. J. Aittoniemi, Espoo, Finland

[73] Assignee: Outokumpu Oy, Helsinki, Finland

[21] Appl. No.: 649,175

[22] Filed: Feb. 4, 1991

Related U.S. Application Data

[63] Continuation of Ser. No. 429,699, Oct. 31, 1989, abandoned.

[30] Foreign Application Priority Data

Nov. 1, 1988 [FI] Finland ............................. 885027

[51] Int. Cl.$^5$ .............................................. G08B 13/14
[52] U.S. Cl. ........................................ 340/572; 340/551
[58] Field of Search ....................... 340/568, 551, 572; 324/423, 326

[56] References Cited

U.S. PATENT DOCUMENTS

| 4,012,690 | 3/1977 | Heytow | 340/552 |
| 4,489,313 | 12/1984 | Pfister | 340/572 |
| 4,866,424 | 9/1989 | Parks | 340/572 |

Primary Examiner—Jin F. Ng
Assistant Examiner—Thomas J. Mullen, Jr.
Attorney, Agent, or Firm—Brooks Haidt Haffner & Delahunty

[57] ABSTRACT

The invention relates to a metal detector for detecting metal objects in the material passing through the apparatus by means of a magnetic field induced by eddy currents. According to the invention, in the area between the transmitter coil system (1, 6) and the receiver coil system (3, 7) of the metal detector, there is installed at least one electrically insulated but electroconductive and/or magnetic element (2, 4, 5) in order to change the sensitivity distribution of the metal detector.

11 Claims, 3 Drawing Sheets

Fig. 1
Fig. 2
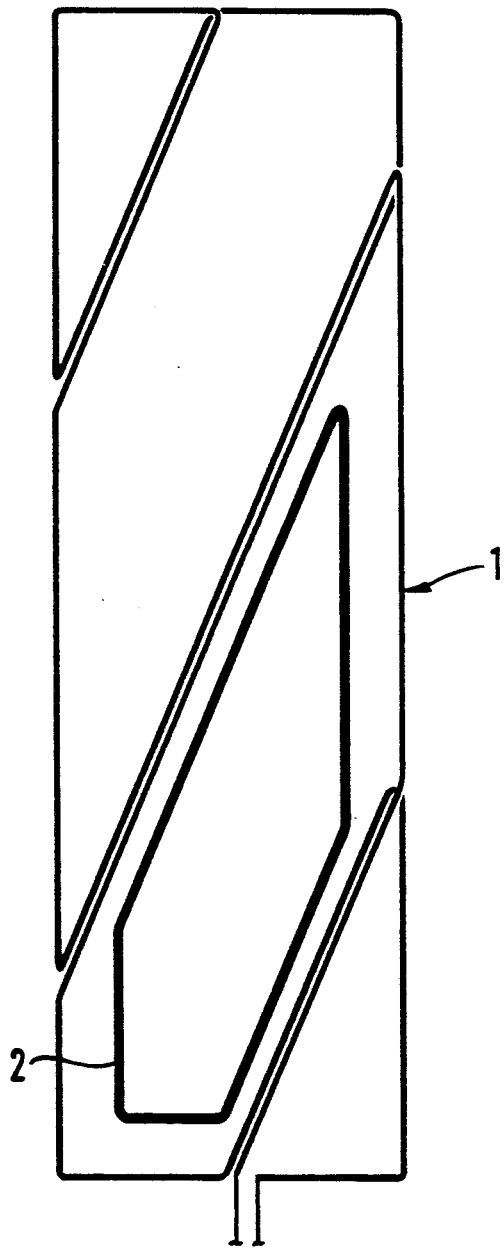
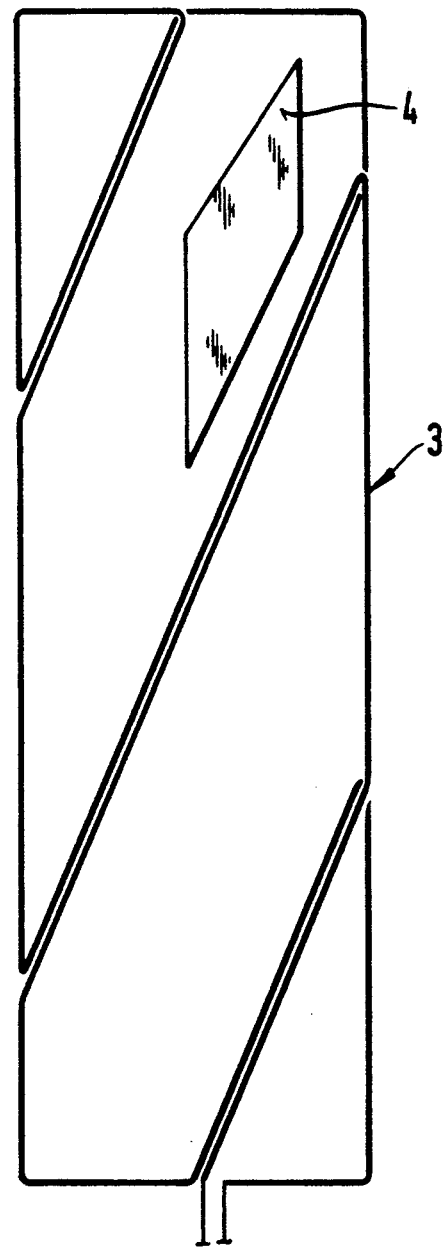

METAL DETECTOR

This application is a continuation of application Ser. No. 07/429,699, filed Oct. 31, 1989, now abandoned.

The present invention relates to a metal detector for detecting metal objects in a material passing through the apparatus by means of a magnetic field induced by eddy currents.

In the normal security applications of current metal detectors, such as airport security checks, the biggest problems are false alarms caused by harmless objects. The sensitivity of the device is generally set so that a given test weapon always gives the alarm, irrespective of its position and location in the gate. The sensitivity is thus set according to the least sensitive point in the gate. On the other hand, the sensitivity elsewhere in the gate may be essentially higher than the said minimum sensitivity, in which case small and harmless objects cause false alarms. In minimizing false alarms, the evenness of the sensitivity distribution in the gate is an essential factor.

In the metal detector developed by Outokumpu Inc, it has been attempted to even the sensitivity distribution out by intensified coil planning and by means of a specific, patented (FI patent 74,288) double coil system. The coil arrangements are based on computer aided planning, where various coil modifications are examined by way of simulation. In addition to the sensitivity distribution, other requirements are also set for the coils of the metal detector, such requirements being for instance certain electric parameters, limited size, production costs and ability to eliminate external interference. Thus the final outcome cannot be essentially improved by coil planning only.

The object of the present invention is to eliminate some of the drawbacks of the prior art and to achieve an improved detector for metal objects, where false alarms caused by harmless objects can be essentially reduced.

According to the invention, advantageously in the coil system of the FI patent 74,288 for instance, or in a corresponding coil system or in the vicinity thereof, the said coil system comprising a transmitter coil system and a corresponding receiver coil system, there is placed an electroconductive and/or magnetic element, whereby the local and/or chronological behaviour of the magnetic field of the coil can be adjusted. An example of such a passive magnetic field adapter is for instance a short-circuiting loop, whereto passive components, such as a resistance condensator and/or a coil, can be connected. The employed passive field adapters can also be metal plates.

For the sake of simplicity, let us observe an example of a short-circuiting loop, which is placed in the vicinity of a transmitter coil. The current induced to the loop is $I_m$, which can be illustrated as follows:

$$I_m = (-jwMI_t)/(R_m + jwL_m), \quad (1)$$

where
- j = imaginary unit
- w = angle frequency ($2\pi f$)
- M = mutual inductance of the transmitter and adapter
- $I_t$ = transmitter current
- $R_m$ = resistance of the field adapter
- $L_m$ = inductance of the field adapter It is observed that if the factor $wL_m$ is remarkably larger than the factor $R_m$, the current induced to the field adaptor is not dependent on the frequency, and is in the same phase (or in the opposite phase) as the transmitter current. In metal detectors this can be achieved for instance by using a copper conductor with a diameter of 8-12 mm. In cases where the term $R_m$ is remarkable in the denominator of the formula (1), the phase of the current induced to the adapter deviates from the phase of the transmitter current. In a metal detector, such a situation can be achieved by using a short-circuiting loop made of a sufficiently thin wire, or by coupling the loop ends together by means of a resistor.

In the above example, a short-circuiting loop was observed as an example of a field adapter. An adapter made of a metal plate behaves in a similar way. If the plate is thin, the adapter shifts the phase. If the plate is thick, the adapter does not shift the phase.

According to the general principle of reciprocity in electromagnetism, the adapter operates according to the above description also when placed in the vicinity of the receiver coil. In fact, the adapter always affects the operation of both the transmitter and the receiver coil. When necessary, several adapters can be used in one metal detector.

Among passive field adapters, there are two major types—those that shift the phase and those that don't. In the non-shifting adapters, the current induced to them is always in the same phase as the current of the coil proper, in which case the field adapter effectively changes the field geometry only. This kind of field adapter can be used for example for evening out the sensitivity distribution of the metal detector in the transversal direction of the said detector.

In order to avoid alarms caused by harmless objects, which are false alarms from the security point of view, the sensitivity of the metal detector is in some cases desired to be locally reduced. This is the case for instance in modifications where many of the persons passing through the metal detector use metal-reinforced safety shoes. In that case the bottom parts of the coils are provided with a metal plate that covers the coils and short-circuits the magnetic fields, such plate being for instance an aluminum plate.

As is obvious from the above specification, the field adapter also affects the phase of the field, provided that the current induced to it is not in the same phase with the coil current. Thus the synchronization of a pulse-operated metal detector can be locally adjusted at the field adapter. Consequently the response caused for instance by non-magnetic, such as aluminum-containing objects, can be locally reduced.

BRIEF DESCRIPTION OF THE DRAWINGS

The invention is described in more detail below, with reference to the appended drawings where FIG. 1 is a side-view illustration of a preferred embodiment of the invention, FIG. 2 is a side-view illustration of another preferred embodiment of the invention.

DETAILED DESCRIPTION OF PREFERRED EMBODIMENTS

According to FIG. 1, essentially near the transmitter coil system 1 of the metal detector, and essentially parallel to the coil system, there is located an element 2 which is electrically insulated from the coil system 1, which element is made for instance of a copper wire with a diameter of 10 mm. The current induced to this element 2 from the coil system 1 is thus in the same phase with the transmitter current, so that the influence of the element 2 changes the geometry of the field of the coil system 1, and thus also the sensitivity distribution of the metal detector.

In the embodiment of FIG. 2, essentially near the receiver coil system 3 of the metal detector, and essentially parallel to the coil system, there is located an element 4 which is electrically insulated from the coil system 3 and is made for instance of aluminum foil with a thickness of 10-100 $\mu$m, depending on how great the influence of the element 4 serving as the field adapter is desired to be. Because the element 4 is thin, the current induced to the element is in a different phase than the transmitter current of the coil system 3, so that the element 4 simultaneously shifts the phase of the magnetic field, too. This phase shift caused by the element 4 is advantageously utilized for instance when it is desired to reduce the response from the aluminum objects passing through the metal detector.

Figure 3:
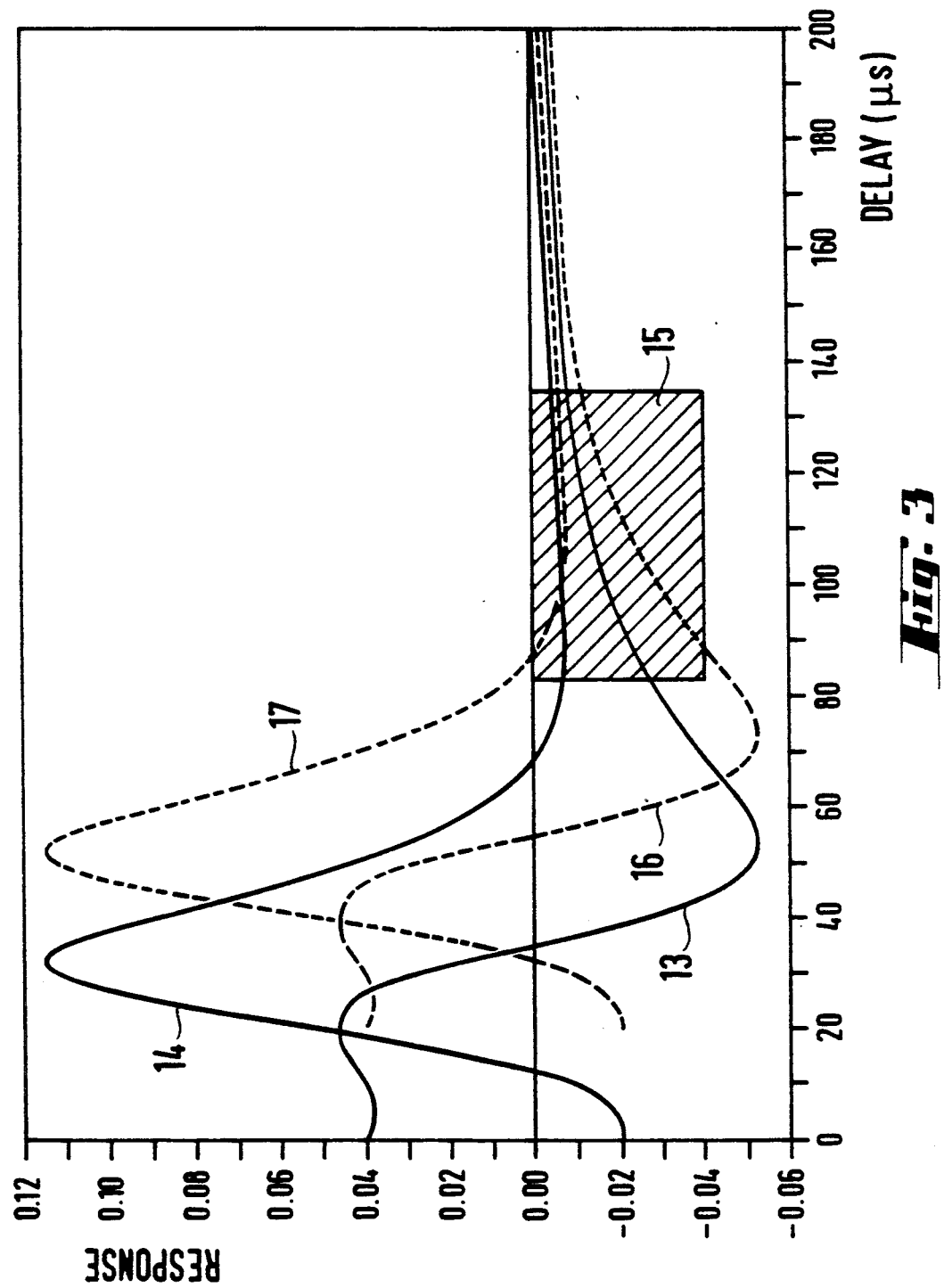
FIG. 3 illustrates the effect of the embodiment of FIG. 2 to the sensitivity distribution of the receiver coil.

FIG. 3 is a schematical illustration of the influence of the preferred embodiment of FIG. 2 to the change in sensitivity with an iron-containing object 13 and with an aluminum-containing object 14, as the function of the delay, when the phase of the magnetic field is shifted. When the point of detection, i.e. the measuring window 15, remains the same without a phase shift in comparison to the prevailing situation, it is apparent from FIG. 3 that the curves represented with dotted lines—i.e. the curves 16 and 17, which deviate from the curves 13 and 14 in their phase shift—cause a change in the response at the measuring window 15. The change with aluminum-containing objects is smaller and with iron-containing objects larger than in measurements carried out without the phase shift.

Figure 4:
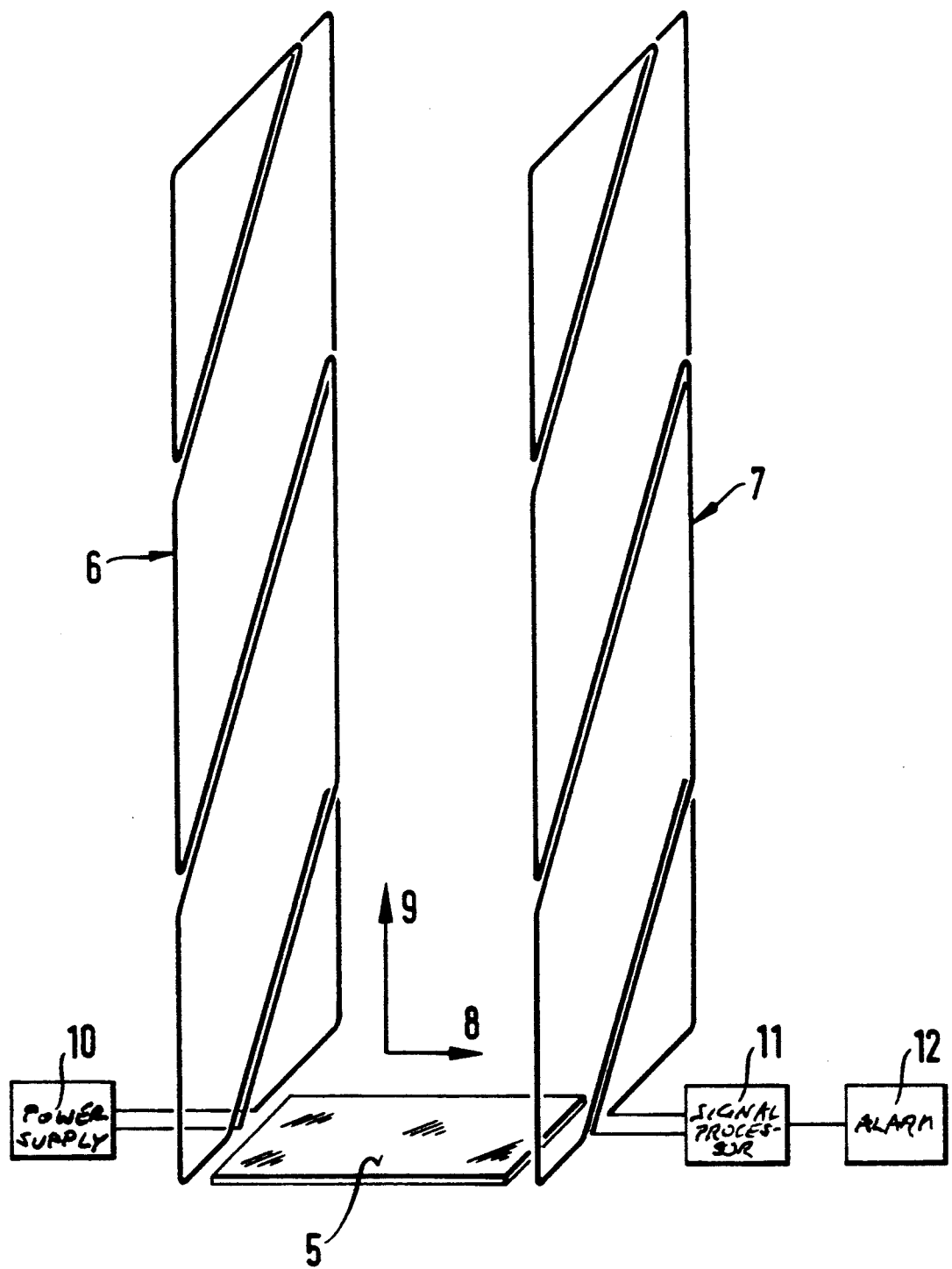
FIG. 4 is yet another illustration of a preferred embodiment of the invention, seen as an axonometric representation.

In FIG. 4, the field adapter 5 of the present invention is located in the space in between the transmitter coil system 6 and receiver coil system 7 of the metal detector, in the detection zone thereof, advantageously in the bottom part of the detector, and in an essentially perpendicular position with respect to the coil systems. The element 5 serving as the field adapter is advantageously made of an aluminum plate with a thickness of 2-5 mm, and by means of this element 5, the component 8, parallel to the element 5 of the magnetic field, is doubled by means of the said element 5, simultaneously as the normal component 9 of the magnetic field disappears from the surface of the object. When in the space in between the transmitter coil system 6 and the receiver coil system 7 there is employed for instance a loop made of metal wire instead of the plate-like element 5, the normal component of the magnetic field can also be made use of in the detection. In order to make for instance the metal detector of FIG. 4 to work, it must be provided with electric power supply means 10 for conducting the electric current into the transmitter coil system 6. Furthermore, the receiver coil system 7 must be electrically provided with signal processing means 11 as well as alarm means 12, in order to be able to detect at least undesirable metal objects.

Although the above specification deals with various preferred embodiments in separate drawings, these embodiments can be combined in many different ways depending on the desired sensitivity distribution of the metal detector.

I claim:

1. A metal detector comprising a transmitter coil system and a receiver coil system, where the transmitter coil system is used for creating primary fields which change their direction and size as a function of location, and these primary fields create a secondary field as a result of eddy currents in an object moving in the said primary fields, wherein the secondary field of the object induces a signal to the receiver coil system; and means for amplifying and processing the signals, wherein in the area between the transmitter coil system and the receiver coil system of the metal detector there is at least one electroconductive and/or magnetic element which is permanently installed in one position and in one orientation relative to said coil systems and is electrically unconnected with said coil systems in order to adjust the sensitivity distribution of the metal detector for avoiding false alarms caused by the passage of harmless metal objects through the detector.

2. The apparatus of claim 1, wherein the element is installed near the transmitter coil system.

3. The apparatus of claim 1, wherein the element is installed near the receiver coil system.

4. The apparatus of claim 1, 2 or 3, wherein the element is installed essentially parallel to the receiver coil system.

5. The apparatus of claim 1, wherein the element is installed in an essentially perpendicular position in relation to the receiver coil system.

6. The apparatus of claim 1, 2 or 3 wherein the element is loop-like in form.

7. The apparatus of any of the claims 1, 2 or 3, wherein the element is plate-like in form.

8. The apparatus of claim 1, wherein the element causes a change in the sensitivity distribution of the metal detector by means of field geometry.

9. The apparatus of claim 1, wherein the element causes a change in the sensitivity distribution of the metal detector by means of the phase of the magnetic field.

10. The apparatus of any of the claims 1, 2 or 3, wherein the element is made of copper.

11. The apparatus of any of the claims 1, 2 or 3, wherein the element is made of aluminum.

* * * * *